(12) United States Patent
Bochskanl et al.

(10) Patent No.: US 10,619,507 B2
(45) Date of Patent: Apr. 14, 2020

(54) TURBOCHARGER COMPRISING A SLIDER FOR FLUID CONNECTION

(71) Applicant: Bayerische Motoren Werke Aktiengesellschaft, Munich (DE)

(72) Inventors: Eugen Bochskanl, Neufahrn (DE); Josef Bauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/040,601

(22) Filed: Jul. 20, 2018

(65) Prior Publication Data

US 2018/0328218 A1 Nov. 15, 2018

Related U.S. Application Data

(63) Continuation of application No. PCT/EP2016/078932, filed on Nov. 28, 2016.

(30) Foreign Application Priority Data

Jan. 21, 2016 (DE) .......................... 10 2016 200 812

(51) Int. Cl.
*F01D 17/14* (2006.01)
*F02B 37/22* (2006.01)
(Continued)

(52) U.S. Cl.
CPC ......... *F01D 17/143* (2013.01); *F01D 17/146* (2013.01); *F02B 37/22* (2013.01);
(Continued)

(58) Field of Classification Search
CPC ...... F01D 17/143; F01D 17/146; F01D 9/026; F02B 37/22; F02B 37/025; F02C 6/12; F05D 2220/40
(Continued)

(56) References Cited

U.S. PATENT DOCUMENTS 3,423,926 A 1/1969 Nancarrow et al.
3,614,259 A * 10/1971 Neff .................. F01D 9/026
415/205

(Continued)

FOREIGN PATENT DOCUMENTS

DE 31 45 835 A1 5/1983
DE 40 08 508 A1 9/1990
DE 10 2006 022 182 A1 11/2007

OTHER PUBLICATIONS

International Search Report (PCT/ISA/210) issued in PCT Application No. PCDEP2016/078932 dated Jan. 26, 2017 with English translation (four (4) pages).
(Continued)

*Primary Examiner* — Patrick D Maines
*Assistant Examiner* — Dapinder Singh
(74) *Attorney, Agent, or Firm* — Crowell & Moring LLP

(57) ABSTRACT

A turbocharger, in particular a turbocharger for a motor vehicle, is provided. The turbocharger includes a turbine to which exhaust gases can be supplied by two fluid ducts between which a separation wall extends; a closeable fluid connection hole in the separation wall that can be closed by a plate-shaped slider between the fluid ducts. The invention further relates to a motor vehicle comprising the turbocharger.

10 Claims, 3 Drawing Sheets

(51) Int. Cl.
  *F02C 6/12* (2006.01)
  *F01D 9/02* (2006.01)
  *F02B 37/02* (2006.01)
(52) U.S. Cl.
  CPC ............... *F02C 6/12* (2013.01); *F01D 9/026* (2013.01); *F02B 37/025* (2013.01); *F05D 2220/40* (2013.01); *Y02T 10/144* (2013.01)
(58) Field of Classification Search
  USPC .................................................. 60/615, 602
  See application file for complete search history.

(56) References Cited

U.S. PATENT DOCUMENTS

| | | | | |
|---|---|---|---|---|
| 4,512,714 A * | 4/1985 | Kaesser | ................ | F01D 17/146 415/151 |
| 6,073,447 A * | 6/2000 | Kawakami | .............. | F01D 9/026 60/602 |
| 7,481,056 B2 * | 1/2009 | Blaylock | ................. | F02D 23/00 415/151 |
| 8,196,403 B2 * | 6/2012 | Hittle | ..................... | F02M 26/47 60/602 |
| 9,677,460 B2 * | 6/2017 | Styles | ..................... | F02B 33/38 |
| 10,066,542 B2 * | 9/2018 | Zhang | ..................... | F01N 13/10 |

OTHER PUBLICATIONS

German-language Written Opinion (PCT/ISA/237) issued in PCT Application No. PCT/EP2016/078932 dated Jan. 26, 2017 (four (4) pages).

German-language Search Report issued in counterpart German Application No. 10 2016 200 812.9 dated Nov. 23, 2016 with Partial English translation (eleven (11) pages).

\* cited by examiner

TURBOCHARGER COMPRISING A SLIDER FOR FLUID CONNECTION

CROSS REFERENCE TO RELATED APPLICATIONS

This application is a continuation of PCT International Application No. PCT/EP2016/078932, filed Nov. 28, 2016, which claims priority under 35 U.S.C. § 119 from German Patent Application No. 10 2016 200 812.9, filed Jan. 21, 2016, the entire disclosures of which are herein expressly incorporated by reference.

BACKGROUND AND SUMMARY OF THE INVENTION

The invention relates to a turbocharger having a turbine to which exhaust gases can be supplied from two channel ducts between which there extends a partition, a so-called channel separator, in which a closable channel connection opening is formed. Moreover, the invention relates to a motor vehicle having such a turbocharger.

Exhaust-gas turbochargers are known in which a turbine is fed from two channel ducts, i.e. two exhaust-gas flows separated from one another. The two channel ducts can be selectively connected to one another via a channel connection opening, i.e. a closable opening. In the case of a four-cylinder internal combustion engine, for example, one of the channel ducts channels the exhaust-gas flow from the $1^{st}$ and $4^{th}$ cylinder and the other of the channel ducts channels the exhaust-gas flow from the $2^{nd}$ and $3^{rd}$ cylinder to the inlet of the turbine of the exhaust-gas turbocharger. In a low-load range, it is advantageous if the channel connection opening is closed such that pulsations of one cylinder are not transmitted to the other cylinders. Moreover, with regard to a single cylinder, the closed channel connection opening leads to a narrower cross section of the exhaust-gas flow from the cylinder to the turbine inlet, resulting in better energy utilization in the low-load range. In the nominal or high-performance range, a larger cross section is advantageous, and so the channel connection opening is open and thus the exhaust gases coming from one of the cylinders can flow downstream of the channel connection opening in both channel ducts (cross-sectional enlargement). This also means that the exhaust-gas counterpressure can be reduced in the nominal performance range.

Previous channel connections are embodied either as a throttle flap, as a flap valve or as a disk valve. These solutions have the disadvantage that they can influence the flow progression because, even in the open state, they project partially into the flow, or relatively complex measures are required to avoid this. Another disadvantage is that the previous solutions demand a large space requirement.

It is therefore an object of the invention to provide a turbocharger with a connection of the channel ducts that has advantageous flow properties.

According to one exemplary embodiment of the invention, there is provided a turbocharger having a turbine to which exhaust gases can be supplied from two channel ducts between which there extends a partition in which a closable channel connection opening is formed, wherein the channel connection opening can be closed by a panel-shaped slider which can slide along its panel plane between the channel ducts. This exemplary embodiment has the advantage that the slider allows a situation in which the slider is arranged laterally with respect to the ducts and as a result can be configured with a large diameter and to be sufficiently long in order to ensure good actuation and good sealing without negatively influencing the flow. In the open and closed state of the slider, no disturbance bodies are situated in the two channel ducts. With the slider open, the crosstalk flow can be made very favorable by the directly adjacent position of the channel ducts. Overall, more favorable flow conditions can be achieved than in the prior art. The use of a slider and the thus possible external position means that the guide can be provided with the required guide surfaces and plays and jamming can thereby be prevented. Moreover, the guide, by virtue of its external position, is removed from the relatively high temperatures. Furthermore, gas forces are for the most part perpendicular to the direction of movement of the slider, resulting in low retaining forces in the displacement system.

According to a further exemplary embodiment of the invention, in the closed state of the slider, a front end of the slider is arranged within the channel connection opening and an outer surface of the slider bears against an inner surface of the channel connection opening.

According to a further exemplary embodiment of the invention, the slider tapers toward a front end in its panel plane and traversely to a sliding direction. The advantage of this exemplary embodiment is that, by virtue of this shape, the slider is released from the inner surface of the channel connection opening directly after the start of the opening movement from the completely closed position, with the result that an effortless opening actuation is made possible and jamming between slider and channel connection opening is avoided. Furthermore, this shape allows a situation in which the slider, in the closed state, can bear with prestress against the entire inner surface of the channel connection opening.

According to a further exemplary embodiment of the invention, of an inner surface of the channel connection opening and of an outer surface of the slider, one is formed concavely and the other is formed convexly. The advantage of this embodiment is that the slider is thus guided during the closing operation and, when the closing operation takes place, the outer surface of the slider engages in the inner surface of the channel connection opening. In addition, with the slider in the completely closed state, the inner surface can thus take up forces in the direction of the z axis.

According to a further exemplary embodiment of the invention, the turbocharger further comprises a housing, in which the channel ducts are formed, and a cover which can be fastened to the housing and in which at least half of the slider is accommodated in the opened state of the channel connection opening.

According to a further exemplary embodiment of the invention, the turbocharger has a sliding element at one end of which the slider is formed and which has a panel-shaped guide plate whose panel plane is perpendicular to the panel plane of the slider, wherein the guide plate of the sliding element limits a sliding movement of the slider.

According to a further exemplary embodiment of the invention, a guide disk is arranged between the cover and the housing, which guide disk is pressed against the housing by the cover and which has a guide gap whose dimension in a direction normal to the panel plane of the slider substantially corresponds to that of the slider. One function is that of sealing the channel ducts with respect to the cover or at least that of reducing the inflow of exhaust gas. In addition, the guide disk 15 serves as an antirotation safeguard for the slider.

According to a further exemplary embodiment of the invention, the guide plate is guided by an inner surface of the cover. Consequently, the cover performs both guiding and sealing functions.

According to a further exemplary embodiment of the invention, the sliding element has, on the opposite side to the slider, and with respect to the guide plate, a guide shaft which is surrounded by a guide sleeve which in turn is held by the cover.

According to a further exemplary embodiment of the invention, an actuator rod for actuating the sliding element by means of a ball joint engages in the guide shaft. The attachment by means of a ball joint makes it possible to compensate for manufacturing or installation tolerances.

According to a further exemplary embodiment of the invention, the guide plate has through-holes or grooves, which grooves are incorporated on its outer circumference. Consequently, pressure differences during opening and closing of the slider are avoided.

Moreover, the invention relates to a motor vehicle having a turbocharger as claimed in one of the preceding claims.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
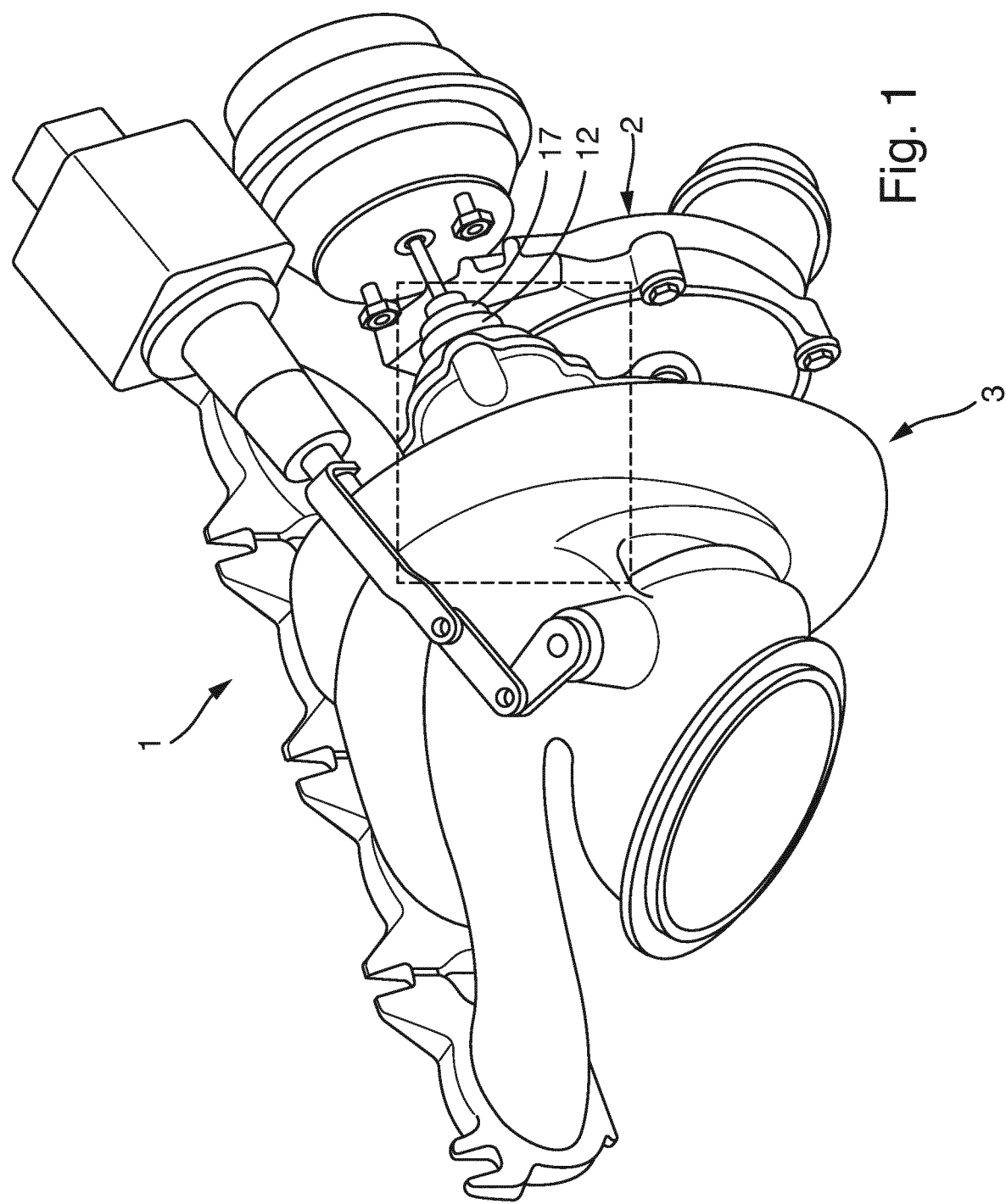
FIG. 1 shows a turbocharger according to one exemplary embodiment of the invention.

FIG. 1 shows a turbocharger 1 having a compressor 2 for compressing an intake air of an internal combustion engine, in particular for a motor vehicle. The compressor 2 is arranged on the same shaft as a turbine 3 which is driven by exhaust-gas flows emanating from cylinders of the internal combustion engine and thus drives the compressor 2 connected thereto for conjoint rotation. The frame illustrated by a dashed line approximately indicates the inlet region of the turbine 3 that is described in more detail hereinbelow.

Figure 2A:
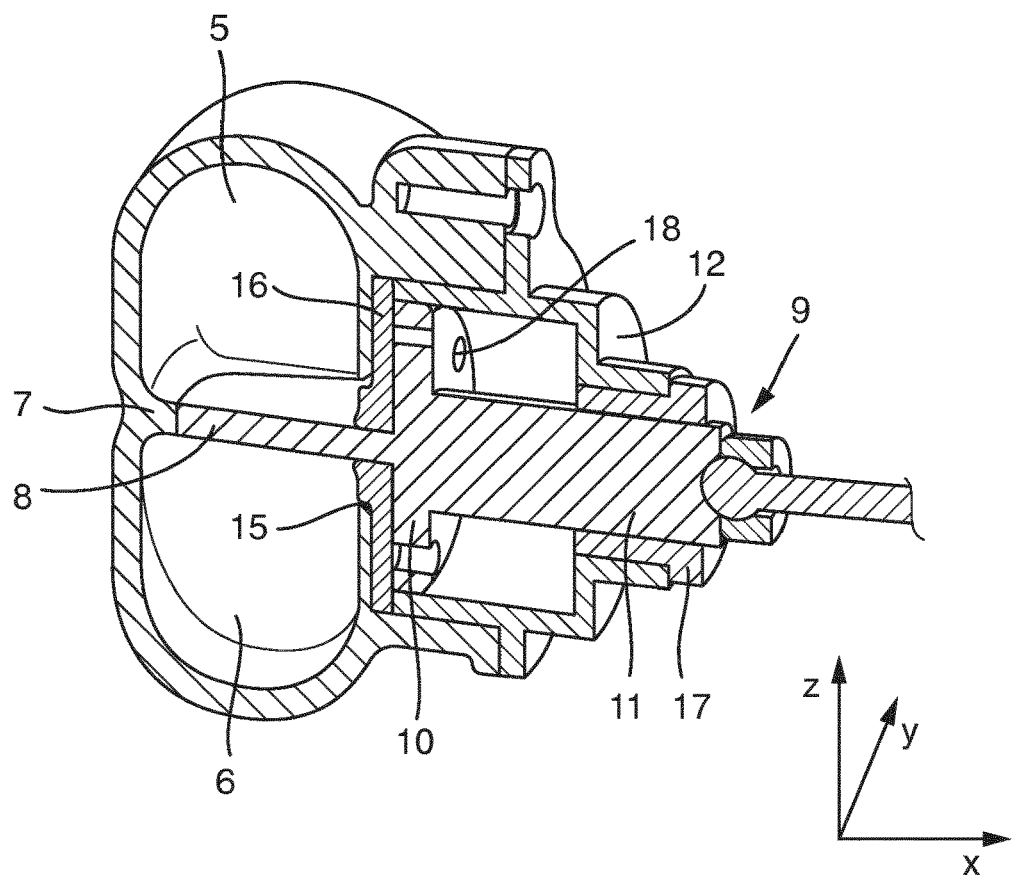
FIG. 2A shows a three-dimensional sectional illustration of a two-channel inlet region of a turbine of the turbocharger according to one exemplary embodiment of the invention, wherein a closed slider closes a channel connection opening.
Figure 2B:
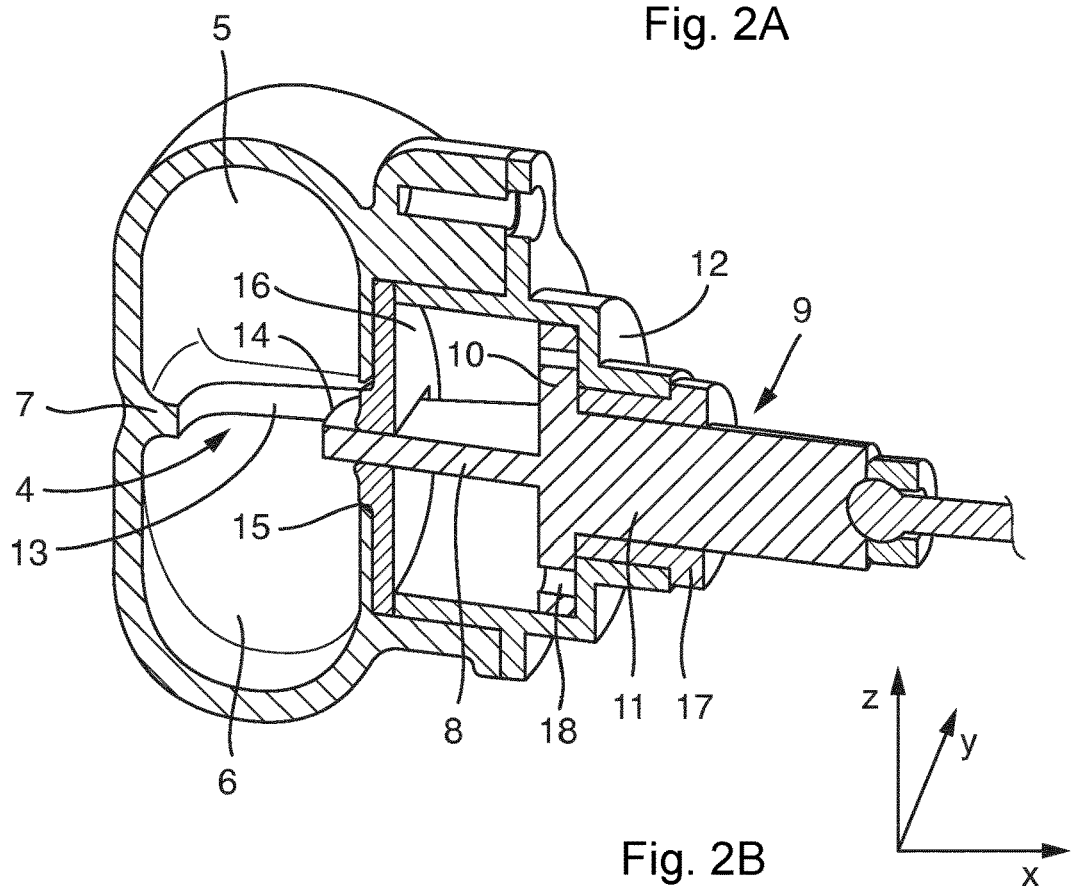
FIG. 2B shows the subject matter of FIG. 2A with an opened slider for opening the channel connection opening.

FIGS. 2A and 2B show a three-dimensional sectional illustration of a two-channel inlet region of the turbine 3 of the turbocharger 1 according to one exemplary embodiment of the invention. In FIG. 2A, a channel connection opening 4 is closed and in FIG. 2B, it is open.

In the turbocharger 1, two channel ducts 5 and 6 lead from cylinders (not shown) of the internal combustion engine to an air inlet of the turbine 3. Here, the channel ducts 5 and 6 are flow ducts which are separated from one another and which are formed in the same housing in which the turbine is also accommodated. Between the channel ducts 5 and 6 there is a partition 7, a so-called channel separator, which separates the directly adjacent channel ducts 5 and 6 from one another. The walls of the channel ducts 5 and 6 are formed in one piece, in particular monolithically, with the housing which accommodates the turbine. The channel ducts 5 and 6 are connected to one another via the channel connection opening 4 between a turbine-side end and a cylinder-side end. Apart from this channel connection opening 4, there is no fluid connection between the turbine-side end and the cylinder-side end of the channel ducts 5 and 6. The channel connection opening 4 can be closed by means of a slider 8, with the result that the channel ducts 5 and 6 are completely separated from one another between the turbine-side end and the cylinder-side end. On the other hand, the channel connection opening 4 can be freed with the slider 8 drawn back, with the result that the channel connection opening 4 is open. It is preferable, during operation, for only the completely opened and the completely closed position of the slider 8 to be used; however, intermediate positions are also conceivable and possible. The advantages and reasons for opening and closing the channel connection opening 4 have already been stated in the introductory part of the description and shall not be repeated here.

In this exemplary embodiment, the slider 8 is designed as a portion of a sliding element 9 which on a front end has the slider 8 and, adjoining this, a guide plate 10 and, adjoining the latter, a guide shaft 11. The guide plate 10 is completely accommodated in a cover 12 which is fastened, for example screwed, directly on the housing forming the channel ducts.

FIGS. 2A and 2B each depict a right-angled coordinate system whose x axis corresponds to a longitudinal direction of the sliding element 9 and of the slider 8 along which the sliding element 9/the slider 8 can be displaced. The y axis is perpendicular to the x axis and the z axis is perpendicular to the x and y axis.

The slider 8 is panel-shaped, preferably with a planar upper side and a planar lower side which extend parallel to one another. The panel shape of the slider thus defines a plane which is parallel to the xy plane. The slider 8 tapers toward its front end or toward its guide end in its panel plane perpendicular to the longitudinal axis, i.e. parallel to the y axis. The front end of the slider 8 is rounded off. Within the xy plane, the channel connection opening 4 is substantially U-shaped with trapezoidal tapering with the open side toward the slider 8. If viewed along the z axis, a contour profile of an inner surface 13 of the channel connection opening 4 that is directed toward the slider 8 corresponds to a contour profile of an outer surface 14 of the slider 8 that is directed toward the inner surface 13. In the closed state of the slider 8, the outer surface 14 of the slider 8 bears against the inner surface 13 over the entire length thereof and the channel connection opening 4 is then ideally closed in a fluid-tight manner. An opening 15 through which the slider 8 extends in the assembled state is provided to form the channel connection opening 4 and/or to machine the inner surface 13 during the production process. To close this opening 15, there is provided a guide disk 16 which is of panel-shaped design with a circular outer circumference. In the center, there is provided a gap which is dimensioned such that the slide 8 fits through with an accurate fit in the closed state. The guide disk 16 is pressed by the cover 12 against the housing forming the channel ducts and thus fixed. One function is that of sealing the channel ducts 5, 6 with respect to the cover 12 or at least that of reducing the inflow of exhaust gas. In addition, the guide disk 15 serves as an antirotation safeguard for the slider 8.

The guide plate 10 is panel-shaped, preferably in the form of a disk with a circular outer circumference. The radially outwardly directed surface of the guide plate 10 slides on an inner surface of a first cylindrical portion of the cover 12, with the result that the guide plate 10 is guided by the inner surface of the cover 12 during displacement. Adjacently, on the side remote from the channel ducts, the cover 12 is provided with a second cylindrical portion of smaller diameter than the first cylindrical portion. The two cylindrical portions are connected via an end wall. A guide sleeve 17, which guides the guide shaft 11, is inserted into the second cylindrical portion.

The movement of the sliding element 9 can be limited in a slide-in direction or closing direction by abutment of the guide plate 10 against the guide disk 16 and/or by abutment of the outer surface 14 against the inner surface 13. In the closed state, the outer surface 14 of the slider bears under prestress against the inner surface 13 of the channel connection opening 4, with the result that optimally good sealing is achieved. In addition, it is also possible for the guide plate 10 to bear under prestress against the guide disk 16, with the result that optimally good sealing is also achieved between these elements.

The movement of the sliding element 9 can be limited in an extraction direction or opening direction by abutment of the guide plate 10 against an inner side of the end wall of the cover 12. In the completely opened state, the guide plate 10 bears under prestress against the end wall of the cover 12, with the result that optimally good sealing is achieved therebetween.

To avoid pressure differences during opening and closing of the slider 8, the guide plate 10 is provided with through-holes 18 or with cutouts or grooves (not shown) which are incorporated on the outer circumference.

Figure 3A:
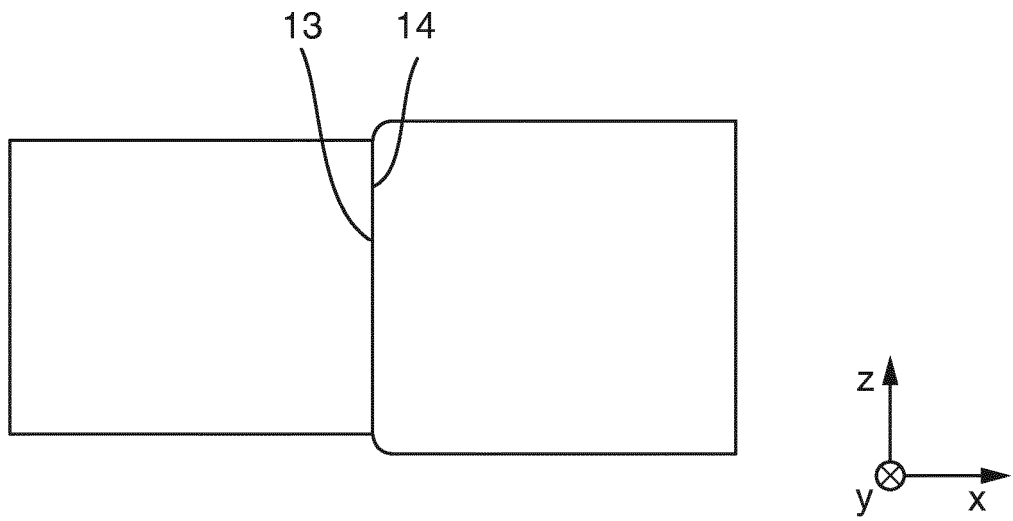
FIG. 3A shows an inner surface of the channel connection opening and an outer surface of the slider according to a first exemplary embodiment of the invention.

FIG. 3A shows the inner surface 13 of the channel connection opening 4 and the outer surface 14 of the slider 8 according to a first exemplary embodiment of the invention. In the illustrated state, the slider 8 is completely closed, with the result that the inner surface 13 bears against the outer surface 14. As can be seen, both the inner surface 13 and the outer surface 14 extend, in particular over their entire length, rectilinearly and parallel to the z axis.

Figure 3B:
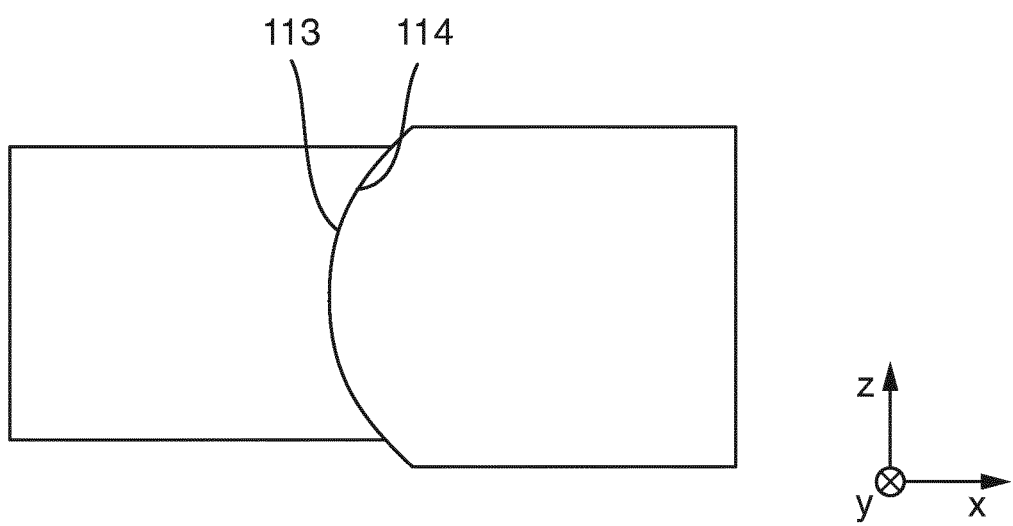
FIG. 3B shows an inner surface of the channel connection opening and an outer surface of the slider according to a second exemplary embodiment of the invention.

FIG. 3B shows an inner surface 113 of the channel connection opening 4 and an outer surface 114 of the slider 8 according to a second exemplary embodiment of the invention. In the illustrated state, the slider 8 is completely closed, with the result that the inner surface 113 bears against the outer surface 114. The inner surface 113 and the outer surface 114 each differ from the inner surface 13 and the outer surface 14 only in terms of the contour described hereinbelow. In a cross section in an xz plane, the contour of the inner surface 113 is concave and the contour of the outer surface 114 is convex. This could also be the other way around. The advantage of this embodiment is that the slider 8 is thus guided during the closing operation and, when the closing operation takes place, the outer surface 114 of the slider 8 engages in the inner surface 113 of the channel connection opening 4. In addition, the inner surface 113 can thus take up forces in the direction of the z axis with the slider 8 in the completely closed state.

While the invention has been illustrated and described in detail in the drawings and the preceding description, this illustration and description are to be understood as illustrative or exemplary and not as restrictive, and there is no intention to restrict the invention to the disclosed exemplary embodiments. The mere fact that specific features are specified in various dependent claims is not intended to indicate that a combination of these features could not also advantageously be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbocharger, comprising:
a turbine;
two channel ducts configured to supply exhaust gases to the turbine;
a channel connection opening between the two channel ducts;
a slider configured to close the channel connection opening when moved between the two channel ducts along a plane containing the slider;
a housing containing at least portions of the two channel ducts;
a cover configured to be fastened to the housing and in which at least half of the slider is accommodated when the slider is in an opened state of the channel connection opening; and
a guide disk arranged between the cover and the housing, the guide disk being biased against the housing by the cover and including a guide gap perpendicular to the plane containing the slide through which the slider is movable in the plane containing the slider.

2. The turbocharger as claimed in claim 1, wherein,
in a closed state of the slider, a front end of the slider is located within the channel connection opening and an outer surface of the slider transverse to the plane containing the slider bears against an inner surface of the channel connection opening.

3. The turbocharger as claimed in claim 2, wherein the slider has a shape which tapers toward the front end in the plane containing the slider.

4. The turbocharger as claimed in claim 3, wherein one of the inner surface of the channel connection opening and the outer surface of the slider is formed concavely and the other of the channel connection opening and the outer surface of the slider is formed convexly.

5. The turbocharger as claimed in claim 1, wherein
a sliding element at a rear end of the slider includes a guide plate perpendicular to the plane containing the slider, and
the guide plate of the sliding element is configured to limit movement of the slider.

6. The turbocharger as claimed in claim 1, wherein the guide plate is guided by an inner surface of the cover.

7. The turbocharger as claimed in claim 1, wherein the sliding element has, on a side opposite the slider, a guide shaft surrounded by a guide sleeve, and
the guide shaft extends though the cover to a region outside the housing.

8. The turbocharger as claimed in claim 7, further comprising:
an actuator rod for actuating the sliding element,
wherein the actuator rod engages the guide shaft via a ball joint.

9. The turbocharger as claimed in claim 8, wherein the guide plate has through-at least one of holes and grooves, and if present the grooves are arranged at an outer circumference of the guide plate.

10. A motor vehicle, comprising:
an engine of the motor vehicle; and
a turbocharger coupled to the engine, the turbocharger having
 a turbine,
 two channel ducts configured to supply exhaust gases to the turbine,
 a channel connection opening between the two channel ducts, and
 a slider configured to close the channel connection opening when moved between the two channel ducts along a plane containing the slider;
 a housing containing at least portions of the two channel ducts;
 a cover configured to be fastened to the housing and in which at least half of the slider is accommodated when the slider is in an opened state of the channel connection opening; and
 a guide disk arranged between the cover and the housing, the guide disk being biased against the housing by the cover and including a guide gap perpendicular to the plane containing the slide through which the slider is movable in the plane containing the slider.

* * * * *